United States Patent Office 3,459,661
Patented Aug. 5, 1969

3,459,661
LUBRICATING COMPOSITIONS CONTAINING METAL SALTS OF PARTICULAR CONDENSATION PRODUCTS
Roland T. Schlobohm, Bethalto, Ill., assignor to Shell Oil Company, New York, N.Y., a corporation of Delaware
No Drawing. Filed Jan. 20, 1967, Ser. No. 610,469
Int. Cl. C10m 1/36, 1/20
U.S. Cl. 252—42.7          11 Claims

ABSTRACT OF THE DISCLOSURE

A multi-functional lubricating oil composition is obtained by incorporating into a lubricating oil a minor amount of an additive which is prepared by neutralizing the reaction product (1) of amino-amide, (2) an aldehyde and (3) a phenol. The neutralized product may subsequently be carbonated if desired.

---

This invention relates generally to the above-described additive and particularly to lubricating compositions containing the additive. Specifically, the invention provides lubricating compositions having good detergency, oxidation stability and low corrosivity to metals.

Compositions of the present invention have particular utility as lubricating oil compositions for use in internal combustion engines, such as automotive, light aircraft, diesel and 2-stroke engines.

In lubricating internal combustion engines oils are used which have been modified with additives to enhance the properties thereof to protect the engines under the adverse operating conditions which may be encountered therein, such as high temperatures and pressures over intended periods of time as well as frequent startings at high and low temperatures. Certain additives may be used to improve the cleanliness of the engine. They function by their ability or capacity to keep dirt, i.e., sludge, dispersed in oil. Other additives, for example, may be used to inhibit rushing or corrosion. In certain applications, such as lubricating of diesel engines, the thermal stability of the additive itself is of primary importance, since if it breaks down at high temperatures it will not only lose its function, but will contribute to engine sludge. Consequently, it would be desirable to provide an additive which effectively enhances several properties of a lubricant, even under severe operating conditions such as those encountered in internal combustion engines.

In accordance with the present invention multi-functional lubricants having good cleanliness and oxidation stability properties are provided which are particularly suitable for use in lubricating internal combustion engines by incorporating into a lubricating oil base a minor amount of an additive having a high thermal stability and low corrosivity to metals obtained by neutralizing, and preferably in addition thereto carbonating, an oil-soluble condensation product of (1) an amino-amide formed by reacting a carboxylic acid with a polyalkylene amine, (2) an aldehyde, such as formaldehyde, and (3) an alkylated phenol.

The condensation product can best be described by reference to the individual reactants involved in its formation.

The amino-amide reactant of the condensation reaction contains at least one amino nitrogen atom having at least one replaceable hydrogen atom. The hydrogen atom is ultimately removed by the reaction of the amino-amide with the aldehyde. The carboxylic acid used to form the amino-amide includes saturated and unsaturated fatty acid having from 8 to 22 carbon atoms; such as iso-fatty acids, e.g., iso-stearic and iso-oleic acids; and mixtures of iso-fatty acids and straight-chain fatty acids, e.g., lauric, myristic, palmitic and/or stearic acids, wherein the iso-fatty acid comprises from 70% to 95% by weight of the mixture. Other carboxylic acids include the neo acids of from 8–22 carbon atoms, such as the branched-chain saturated fatty acids; and dimerized and trimerized fatty acids prepared from unsaturated fatty acids having from 16 to 20 carbon atoms such as dimerized oleic, linoleic and 8,12-eicosadiene-1,20-dioic acid. Mixtures of any of the above acids may be used. The polyalkylene amine used to form the amino-amide is predominantly of the formula

wherein R is a $C_{2-4}$ alkylene radical and $n$ is an integer from 0 to 6 and preferably 0–3. Specific examples of amines of this type are tetraethylene pentamine, ethylene diamine, dipropylene triamine, and the like. The polyamines, however, such as tetraethylene pentamine, often contain as much as from 10 to 30% by weight of branched and cyclic structures, e.g.,

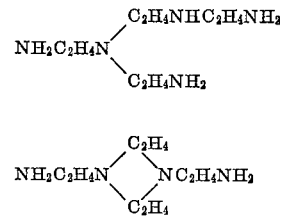

These structures also form amino-amides with the carboxylic acids which in turn form condensation products with aldehydes and phenols. Accordingly, condensation products formed from said structures are intended to be included by the present invention.

The amino-amide is formed by reacting one mole of the polyalkylene amine with from one to four moles of carboxylic acid. Thus, the amino-amide contains at least one acyl group which is attached to nitrogen atom and may contain as many as four, each attached to a different nitrogen atom.

The phenol reactant of the condensation reaction is a $C_{1-22}$ alkylated phenol. From one to four moles of phenol is condensed per one mole of amino-amide. Preferred phenols are the alkylated phenols wherein the alkyl group is $C_{8-18}$ alkyl group. Phenols of this type include dodecylphenol, decylphenol, nonylphenol and the like.

The aldehyde reactant of the condensation reaction includes aliphatic aldehydes, such as $C_{1-4}$ alkyl aldehydes, e.g., formaldehyde, acetaldehyde, butyraldehyde, aromatic aldehydes such as benzaldehyde and hetero cyclic aldehydes, e.g., furfural, paraformaldehyde, and mixtures of aliphatic, aromatic and/or heterocyclic aldehydes. From one to four moles of the aldehyde is generally condensed per mole of amino-amide.

The neutralized condensation product is obtained by reacting a basic compound such as metal oxide or hydroxide in excess, 5–100% excess, therewith. Suitable metal compounds for this purpose include the alkali and alkaline earth metal oxides and hydroxides, e.g., sodium, potassium, calcium, barium oxides and hydroxides. Particularly preferred are barium and calcium hydroxides.

The neutralized product is then preferably carbonated according to conventional procedures in the presence of excess of the basic compound to form an additive having a large amount of alkalinity. Alkalinity is desirable since it imparts "alkaline reserve" to lubricants which subsequently neutralizes sulfur and acids which form during the use of the lubricant.

The additive of this invention may be incorporated into mineral lubricating oils obtained from paraffinic or aromatic or mixed base crudes, for example, a mineral oil having a viscosity which may vary over a wide range such as from 60 SSU to 2000 SSU at 100° F. Examples of mineral oils of this type are the commercially available SAE 10 to SAE 40 grade motor oils. The additives of the invention may also be incorporated into synthetic lubricating oils such as polymerized olefins, esters and others, as well as mixtures of mineral and synthetic oils.

The additive can be added to any of the above lubricating oils in small amounts of from 0.1 to 10% by weight and preferably from 2% to 5% by weight, although amounts such as 0.01% to 20% by weight may be used, if desired.

The following examples are for purposes of illustrating the invention and are not intended to limit the invention to the particular compounds or compositions described.

EXAMPLE I

This example illustrates a suitable method of preparing an additive of the invention.

One mole of tetraethylene pentamine was reacted with two moles of isostearic acid to form the diisostearamide of tetraethylene pentamine. One mole of this amide was then reacted with 1.5 moles of dodecylphenol and 1.5 moles of formaldehyde. The resulting condensation product was neutralized with excess (>1.5 moles) barium hydroxide in water. 2336 grams of Houston 100 neutral oil was added. Carbonation of the neutralized condensation product was accomplished by adding excess $Ca(OH)_2$ to the product in a 60/40 toluene/methanol solvent while bubbling $CO_2$ through the reaction. After carbonation, the product was isolated by stripping the solvent and water and filtering. The product which was a 33% concentrate in oil, hereinafter referred to as Additive (A) has a sulfated ash content of 15.0%, a total base number of 136 and is believed to be a mixture having the following predominant structures:

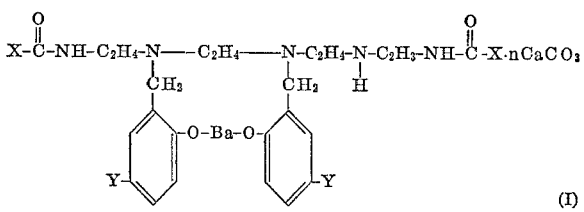

(I)

and

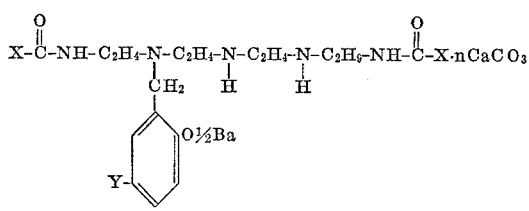

wherein X is an isostearyl radical, Y is a dodecyl radical and $n$ is a positive integer.

EXAMPLE II

The following additives are prepared according to the procedure of Example I and further exemplify additives of the present invention. The additive in each instance has been neutralized and carbonated as in Example I.

Additive B—condensation product of 1 mole of the stearamide of tetraethylene pentamine, 3 moles formaldehyde and 3 moles laurylphenol.

Additive C—condensation product of 1 mole of the dioleamide of diethylene triamine, 1 mole formaldehyde and 1 mole decylphenol.

Additive D—condensation product of 1 mole of the diisooleamide of tetraethylene pentamine, 2 moles formaldehyde and 2 moles dodecylphenol.

Additive E—condensation product of 1 mole of the stearamide of diethylene triamine, 1 mole benzaldehyde and 1 mole octylphenol.

Additive F—additive of Example I wherein $Ca(OH)_2$ was used in place of $Ba(OH)_2$.

Additive G—additive D wherein $Ca(OH)_2$ was used in place of $Ba(OH)_2$ to neutralize and carbonate the product.

As indicated previously, the mole ratio of the reactants used to form the additives may be varied generally from 1–4 moles of aldehyde or phenol per mole of amide, although a lesser or greater mole ratio may be employed, if desired.

EXAMPLE III

The following compositions are formulated from the additives of Examples I and II and illustrate lubricating oil compositions of the present invention.

Composition AA

| | Percent wt. |
|---|---|
| Additive A | 5 |
| SAE 30 mineral lubricating oil | Balance |

Composition BB

| | |
|---|---|
| Additive B | 7 |
| SAE 20 mineral lubricating oil | Balance |

Composition CC

| | |
|---|---|
| Additive E | 2 |
| SAE 40 mineral lubricating oil | Balance |

Composition DD

| | |
|---|---|
| Additive F | 5 |
| 4,4'-methylene bis(2,6-di-t-butylphenol) | 0.5 |
| HVI (high viscosity index), i.e., >95 neutral mineral lubricating oil having a viscosity of about 100 SSU at 100° F. | Balance |

Composition EE

| | |
|---|---|
| HVI 100 N (same oil as in Composition DD) | 100 |

Composition FF

| | |
|---|---|
| Additive A | 5 |
| Composition EE | Balance |

Composition EE

| | |
|---|---|
| 4,4'-methylene bis(2,6-di-t-butylphenol) | 0.5 |
| Composition EE | Balance |

Composition HH

| | |
|---|---|
| 4,4'-methylene bis (2,6-di-t-butylphenol) | 0.5 |
| Composition FF | Balance |

Composition JJ

| | |
|---|---|
| Additive D | 5 |
| SAE 30 mineral lubricating oil | Balance |

EXAMPLE IV

In order to illustrate the effectiveness of the additive of the present invention to impart good oxidation stability and detergency to lubricating oil, an air oxidation test was conducted. In this test, a stream of air (30 ml./min.) was bubbled through a 20-gram sample of an oil composition in the presence of 20 p.p.m. each of copper and iron (as octoates) catalysts. The induction period and oxidation life were recorded for each sample. The induction period is the length of time which elapses before a substantial increase in the rate of oxygen-uptake occurs and is a standard measure of oxidation stability. Oxidation life is the time required to absorb one millimole of oxygen per gram of oil. The results of the test are given in Table I:

TABLE I.—OXIDATION TEST RESULTS

| Composition | Induction period, hrs. | Oxidation life, hrs. |
|---|---|---|
| EE | 0 | 2 |
| FF | 20 | 17 |
| GG | 3 | 12 |
| HH | 43 | 55 |

The dispersing life of Compositions HH, EE and FF were also determined by the blotter spot life test. This test is carried out by placing a drop of composition on a blotter at regular intervals to form a spot and recording the time elapsing before undispersed insolubles appear in the spot. The results of the test are given in Table II.

TABLE II

Dispersing test

| Composition: | Dispersing life, hrs. |
|---|---|
| EE | 0 |
| FF | 28–36 |
| GG | 1–3 |
| HH | 120–136 |

From Tables I and II it can be seen that lubricants containing either no additive of any type (EE) or a small amount of a phenol antioxidant (GG) possess little or no oxidation stability or dispersant properties, whereas lubricants containing the additive of the present invention FF or HH possess both good oxidation stability and dispersant properties.

Similar results are also obtained if, for example, Compositions AA, DD, CC or HH containing 0.5% wt. 4,4'-methylene bis(2,6 - di - t - butylphenyl) were used in the above tests in place of Composition FF.

The additive of the present invention is particularly effective when used in combination with phenol antioxidants, e.g., 4,4-methylene bis(2,6-di-t-butylphenol), since it coacts therewith to provide a synergistic additive combination which imparts greater oxidation stability and dispersant properties to lubricating compositions than expected.

Other additives may also be incorporated into the lubricating compositions according to the present invention, for example, anti-foam agents, viscosity improves, rust inhibitors, and the like, as well as additional antioxidant and dispersant additives.

The additive of the invention is particularly useful in lubricating compositions wherein corrosion of metals, especially copper and lead, is a problem. It has been discovered that in addition to possessing high thermal stability and imparting good dispersing and oxidation stability to lubricants, the additive also has low corrosivity to metals in general, and copper and lead in particular.

The additive is particularly suitable for use in lubricants for internal composition engines such as automobiles, trucks, diesels, or 2-stroke engines, but may also be used with gear lubricants, railroad lubricants, hydraulic fluids, grease and the like.

I claim as my invention:

1. A lubricating oil composition consisting essentially of a major amount of lubricating oil and from 0.1% to about 10% by weight of a neutralized condensation product of (1) a $C_{1-22}$ alkylphenol, (2) an aldehyde selected from the group consisting of $C_{1-4}$ alkylaldehyde, benzaldehyde, furfural, paraformaldehyde and mixtures thereof, and (3) an amino-amide having one free amino group, said amino-amide being the reaction product of an amine having the formula $$NH_2-(R-NH)_n-R-NH_2$$

where R is $C_{2-4}$ alkylene and $n$ is an integer from 0 to 6, with a $C_{8-22}$ fatty acid, wherein reactants (1), (2) and (3) have a respective molar ratio of 1–4:1–4:1, said condensation product being neutralized by a reaction with a basic compound selected from the group consisting of alkali and alkaline earth metal oxides and hydroxides.

2. A composition as defined in claim 1 wherein the product is carbonated.

3. A composition as defined in claim 1 wherein the aldehyde is formaldehyde.

4. A composition as defined in claim 3 wherein the amide is the diisostearamide of tetraethylene pentamine.

5. A composition as defined in claim 4 wherein the phenol is dodecylphenol.

6. A composition as defined in claim 5 wherein the mole ratio of amide to formaldehyde to phenol is 1 to 1.5 to 1.5.

7. The composition as defined in claim 6 wherein the condensation product is neutralized with an alkaline earth metal hydroxide.

8. The composition as defined in claim 7 wherein the hydroxide is berium hydroxide.

9. The composition as defined in claim 8 wherein the product is carbonated in the presence of excess calcium hydroxide.

10. The composition of claim 1 containing an oxidation-stability increasing amount of 4,4' - methylene bis (2,6-di-t-butylphenol).

11. The composition of claim 9 containing 0.5% by weight of 4,4'-methylene bis(2,6-di-t-butylphenol).

References Cited

UNITED STATES PATENTS

| 2,671,758 | 3/1954 | Vinograd | 252—18 |
| 2,781,403 | 2/1957 | Kane | 260—609 |
| 3,230,169 | 9/1962 | Morway | 252—34.7 |
| 3,368,972 | 2/1968 | Otto | 252—47.5 |
| 3,372,118 | 3/1968 | Rense | 252—47.5 |

DANIEL E. WYMAN, Primary Examiner

PHILIP M. FRENCH, Assistant Examiner

U.S. Cl. X.R.

252—18, 25, 51, 52